Dec. 29, 1953  D. LABINO  2,663,906
METHOD FOR PRODUCING GLASS FIBERS AND BONDED MAT
Filed June 19, 1951
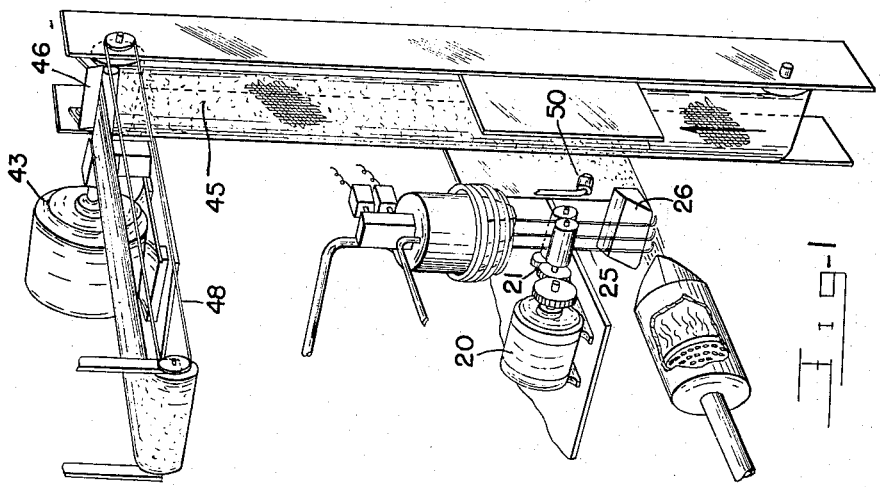
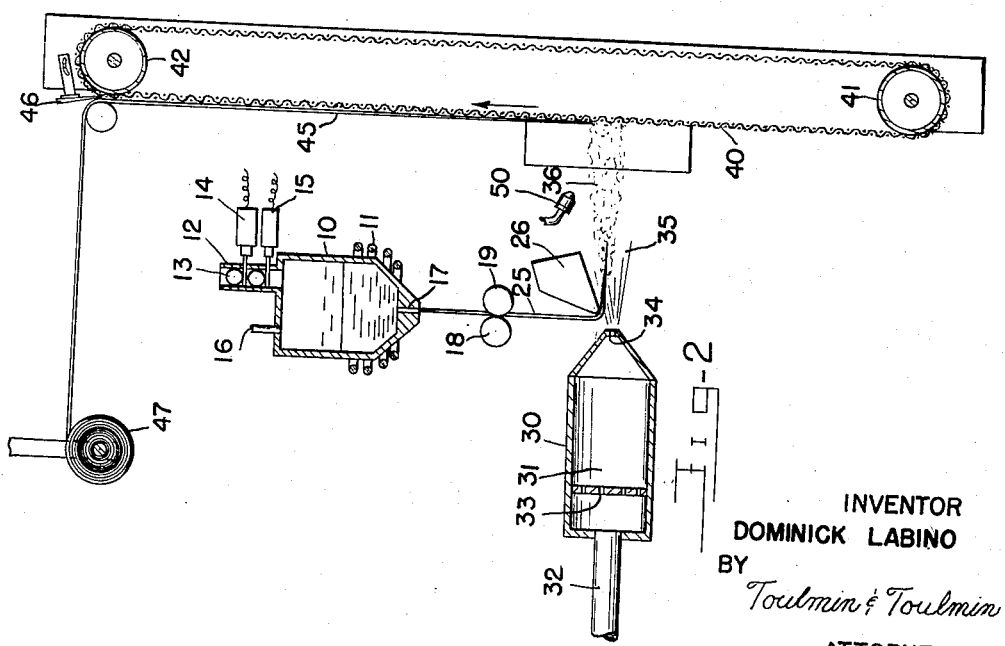
INVENTOR
DOMINICK LABINO
BY
Toulmin & Toulmin
ATTORNEYS Patented Dec. 29, 1953

2,663,906

UNITED STATES PATENT OFFICE 2,663,906

METHOD FOR PRODUCING GLASS FIBERS AND BONDED MAT

Dominick Labino, Maumee, Ohio, assignor to Glass Fibers, Inc., Toledo, Ohio, a corporation of Ohio Application June 19, 1951, Serial No. 232,420

2 Claims. (Cl. 18—47.3)

This invention relates to a method for producing extremely fine glass fibers or filaments and a thin mat from such fibers or filaments.

Staple glass fibers have been used in the art previously in the manufacture of mats and bats in which the staple glass fibers are bonded together into a unit structure. However, the minimum diameter of the glass fibers produced according to the prior art methods and apparatus has been limited to fibers larger than thirty millionths of an inch. Also, it has not been possible by the use of prior art methods of producing staple glass fibers to manufacture extremely thin mats that would have a completely uniform density and structure. The difficulty is encountered because of the relatively large diameter of the fiber and because the fibers have not deposited uniformly in extremely thin layers. The glass fibers in the prior art products using staple fibers tend to bunch together rather than distribute uniformly at a uniform density throughout an entire structure. This is particularly true when attempting to manufacture thin mats. While such bunching of the fibers is of no particular importance in mats and bats of substantial thickness, such defects cannot be permitted in extremely thin layers or mats of staple fiber.

It is, therefore, an object of this invention to provide a method for producing extremely fine glass fibers on the order of ten to twenty millionths of an inch in diameter.

It is another object of the invention to provide a method of producing glass fibers of the character referred to in the foregoing object, but wherein the fibers are collected in a thin mat on the order of one to two thousandths of an inch in thickness.

It is another object of the invention to provide a method for producing extremely fine glass fibers on the order of ten to twenty millionths of an inch in diameter wherein the fibers are so handled as to provide for absolutely uniform distribution of the fine fibers in extremely thin layers or mats.

In accomplishing the foregoing objects, it is also an object of this invention to produce the fine glass fibers by use of a slightly reducing high temperature atmosphere, and wherein the composition of the glass of which the fibers is composed incorporates characteristics of high viscosity and low surface tension obtained by incorporation of metal oxides in the glass whereby a high degree of attenuation can be given to the fluid glass.

Further objects and advantages will become apparent from the drawings and the following description.

In the drawings:

Figure 1 is a perspective elevational view diagrammatically illustrating an apparatus on which the method of this invention can be practiced.

Figure 2 is a vertical cross-sectional view of the essential elements of the apparatus of Figure 1.

Figure 3 is an end elevational view of a high temperature gas producer.

Figure 4 is a bottom view of the melting pot for the glass.

In the method of this invention glass is heated to a molten condition in a heating crucible and discharged through small openings in the bottom of the crucible. The glass streams issuing from the openings in the crucible are mechanically drawn into fine strands which are then directed into engagement with a high velocity blast of high temperature gas to reheat the strands and cause them to be further drawn and attenuated into fine fibers or filaments that are broken into staple fiber lengths. Under the conditions of this invention the high velocity blast of high temperature gas is of a composition that is slightly reducing as distinguished from an oxidizing gas so that the fibers or filaments are produced in a slightly reducing atmosphere.

In the conventional methods of producing staple fibers or filaments, small strands of glass are fed into a high velocity blast of high temperature gas such as that obtained by the combustion of air and natural gas in a burner and discharged through a nozzle opening at high velocity. Such a blast of high temperature gas melts the ends of the small strands rapidly and blows the melted glass in the path of movement of the gas blast causing attenuation of the melted glass into fine fibers or filaments into staple length. To obtain a reasonable volume of staple fiber, a plurality of small strands are fed simultaneously in front of the blast.

This conventional method, however, has caused production of a substantial volume of "shot", that is, small glass balls, that are interspersed with the glass fibers. Also, the glass fibers have tended to bunch or ball into structures of non-uniform density so that the conventional methods have not been wholly satisfactory in producing extremely fine glass fibers or filaments and thin mats made from them.

It has generally been considered necessary to only utilize a gas blast that has high temperature and high velocity to obtain production of fine fibers or filaments, and to this end air and natural gas have been mixed and burned in the combustion chamber of the burner to create the blast.

However, I have found that when the blast of high temperature gas has a composition that is slightly reducing, that fine glass fibers can be produced with complete elimination of "shot." It has been determined that a gas blast that has a composition that is just neutral will not produce the result, the composition of the blast must be on the reducing side with the mixture of air and gas being adjusted to effect a carbon monoxide content of the gas of about two percent of the total volume of gas in the blast. Less than one percent carbon monoxide content in the gas is of substantially no value while more than four percent of carbon monoxide in the gas produces a gas having reducing tendencies that are too strong which affects the composition of the molten glass while it is in a gaeous atmosphere.

I have also determined that to obtain a uniform distribution of fine glass staple fibers in an extremely thin mat on the order of one to two thousandths of an inch in thickness, it is essential that the number of glass strands that are melted by the gas blast and converted into fine glass fibers be somewhat limited and that the spacing of the glass strands relative to one another in a common plane during the melting of the ends of the strands and production of the fine glass fibers be limited to a distance of about one half inch. This distance can be varied by about one eighth of an inch, but the most satisfactory results are obtained when the glass strands are held apart a distance of about one half inch. If the glass strands are placed closer together than a minimum amount referred to, there develops a bunching or gathering of the glass fibers which prevents uniform distribution of them, whereas if the spacing of the glass strands is more than the maximum referred to, there will be areas of thinness in a mat and again no uniform distribution of the fibers results.

To obtain the most satisfactory results in producing glass fibers or filaments having a diameter from ten to twenty millionths of an inch, I have found that a glass composition containing certain metal oxides, such as copper oxide and lead oxide, gives satisfactory results. Examples of such compositions are as follows:

*Example I*

| Constituent | Percent by weight |
| --- | --- |
| $SiO_2$ | 54.3 |
| CaO | 6.92 |
| MgO | 4.12 |
| $Na_2O$ | .36 |
| $B_2O_3$ | 10.5 |
| $R_2O_3$ | 13.98 |
| CuO | 9.82 |
| Total | 100.00 |

*Example II*

| Constituent | Percent by weight |
| --- | --- |
| $SiO_2$ | 54.3 |
| CaO | 6.92 |
| MgO | 4.12 |
| $Na_2O$ | .36 |
| $B_2O_3$ | 10.5 |
| $R_2O_3$ | 13.9 |
| PbO | 9.9 |
| Total | 100.00 |

The $R_2O_3$ set forth in the above examples generally comprises a very small amount of $Fe_2O_3$ and $TiO_2$, the prime portion being $Al_2O_3$. A typical breakdown of this component shows in parts by weight:

| | |
| --- | --- |
| $Al_2O_3$ | 55.52 |
| $TiO_2$ | .54 |
| $Fe_2O_3$ | .43 |
| | 56.49 |

It will be noted that in each of the foregoing examples that the total of the selected oxide and the magnesium and calcium oxides is approximately twenty percent by weight of the glass. Further in each instance the ratio of the sum of the calcium and magnesium weights to that of the selected oxide is very close to 1:1. Under these conditions the melting points of the glass are low for this type of material, that is about 1800 to 1900 degrees Fahrenheit. Further the glasses when molten will have the low surface tension and high interfacial tension required for the production of fibers in the range of ten to twenty millionths of an inch diameter.

Referring now to the drawings, there is an apparatus illustrated diagrammatically on which the method of this invention is practiced. In the apparatus there is provided a heating crucible 10 having a heating coil 11 positioned therearound. Glass is fed into the crucible 10 through a feed tube 12 the gas being in the form of marbles 13 under control of alternately operating solenoid operated slide valve mechanisms 14 and 15. Gas under pressure is supplied to the interior of the heating crucible 10 through the pipe 16. Molten glass exudes through a plurality of openings 17 provided in the bottom wall of the crucible 10. These openings 17 are preferably linearly aligned. The streams of molten glass are engaged by rollers 18 and 19 whereby the glass streams between the rollers 18, 19 and the crucible 10, are drawn and attenuated into fine glass strands preferably on the order of three to four thousandths of an inch.

The rollers 18 and 19 may be driven by an electric motor 20 through gears 21.

The heating coil 11 may be an electric resistance coil, or may be connected to a source of high frequency electrical energy which induces a high frequency current in the coil 11 for heating the crucible 10 and the glass therein.

The holes 17 in the melting crucible 10 are spaced apart about one-half inch, this being the preferable spacing of the holes provided in the crucible from which the most satisfactory results were obtained. The fine glass strands 25 are fed over a guide block 26 so that the ends of the fine strands 25 will be directed into the path of a high velocity stream of high temperature gas issuing from the burner 30.

The burner 30 has a combustion chamber 31 into which air and natural gas is supplied as a mixture through the pipe 32 and the distribution plate 33. The combustible mixture is wholly burned within the combustion chamber 31 so that the gases issuing through the discharge nozzle 34 are at high temperature and high velocity.

The high temperature high velocity gases 35 striking the ends of the glass strands 25 will cause them to melt rapidly and be blown in the direction of flow of the gas stream into fine fibers or filaments.

The gas and air mixture delivered to the burner 30 is such that the gas stream 35 constitutes a slightly reducing atmosphere containing carbon monoxide content of from one percent to four percent of the total volume of gases.

The fine glass fibers 36 are blown onto a fine wire mesh belt 40 that is carried between rolls 41 and 42 driven by an electric motor 43. The glass fibers are collected on the surface of the belt 40 as it moves in the direction of the arrow shown in Figures 1 and 2. The speed of the belt determines the volume of fibers collected on the belt. The glass fibers collecting on the belt 40 forms a mat 45 that is separated from the belt by a blade 46 and is carried to a roll 47. The roll 47 may be driven by a belt 48.

The glass strands 25 are preferably spaced uniformly across the width of the belt 40 so that uniform distribution of the glass fibers is obtained over the surface of the belt, the spacing of the glass strands 25 maintaining a uniform distribution of the glass fibers in passage toward the belt 40. With the glass strands spaced apart about one-half inch and with the collecting belt having a width of approximately two inches, the glass fibers distribute absolutely uniformly over the surface of the belt. Preferably a very small amount of a bituminous binder is sprayed onto the fibers through the nozzle 50 as they travel to the collecting belt 45.

As one example, glass balls having a composition of the glass of Example I are fed into a heating crucible about four inches in diameter in which the glass is melted at a temperature of about 2250 degrees Fahrenheit. Gaseous pressure of about three inches of water is maintained on the body of molten glass in the heating crucible to exude the molten glass through three small openings about one-sixteenth of an inch in diameter in the bottom of the crucible and spaced one-half inch apart. The glass streams discharging from the crucible are engaged between a pair of rolls to cause the streams to be attenuated into thin glass strands of about three to four thousandths of an inch in diameter. The glass strands are fed into a gas blast issuing from the burner. Air and natural gas is supplied to the burner in a selected mixture to cause the composition of the gas issuing from the burner to contain from one percent to four percent carbon monoxide and thereby provide a gas having a reducing effect. The temperature of the blast issuing from the burner is in the neighborhood of 2500 degrees Fahrenheit. The glass strands fed into the gas blast will have their ends melted rapidly and be drawn out into fine glass fibers or filaments of a diameter of from ten to twenty millionths of an inch.

It will be understood that modifications of the invention can be made without departing from the general concept of the invention and those modifications which fall within the scope of the appended claims are intended to be included herein.

Having thus fully described my invention, what I claim as new and desire to secure by Letters Patent, is:

1. The method of producing staple glass fibers of uniform fineness which fibers are substantially free of shot, said method comprising the steps of establishing a plurality of strands of glass filaments, directing a high temperature gaseous blast against the ends of said plurality of filaments to melt said filaments at their ends, said gaseous blast having a carbon monoxide content by volume of between about 1 to 4% providing a reducing atmosphere, said gaseous blast being directed against the filaments at high velocity to blow and attenuate said filaments into uniform staple fibers of microscopic fineness.

2. The method of producing staple glass fibers of uniform fineness which fibers are substantially free of shot from glass containing an oxide selected from the group consisting of lead and copper oxides, said method comprising the steps of establishing a plurality of strands of glass filaments separated from each other sufficiently to prevent bunching, directing a high temperature gaseous blast against the ends of said plurality of filaments to melt said filaments at their ends, said gaseous blast having a carbon monoxide content by volume of between about 1 to 4% providing a reducing atmosphere, said gaseous blast being at a temperature of approximately 2500° F. and being directed against the filaments at high velocity to blow and attenuate said filaments into uniform staple fibers of microscopic fineness with diameters between about 10 and 20 millionths of an inch.

DOMINICK LABINO.

References Cited in the file of this patent

UNITED STATES PATENTS

| Number | Name | Date |
| --- | --- | --- |
| 2,450,363 | Slayter et al. | Sept. 28, 1948 |
| 2,460,993 | LeBrasse et al. | Feb. 8, 1949 |
| 2,489,242 | Slayter | Nov. 22, 1949 |
| 2,489,243 | Stalego | Nov. 22, 1949 |
| 2,489,244 | Stalego | Nov. 22, 1949 |

OTHER REFERENCES

Steam, Its Generation and Use, published by the Babcock & Wilcox Co., New York, 35th Edition, 1913, page 231.